(12) United States Patent
Ward

(10) Patent No.: US 7,805,473 B2
(45) Date of Patent: Sep. 28, 2010

(54) DATA CENTER MANAGEMENT SYSTEMS AND METHODS

(75) Inventor: Keith S. Ward, Colorado Springs, CO (US)

(73) Assignee: Oracle International Corporation, Redwood Shores, CA (US)

( * ) Notice: Subject to any disclaimer, the term of this patent is extended or adjusted under 35 U.S.C. 154(b) by 1589 days.

(21) Appl. No.: 11/088,371

(22) Filed: Mar. 23, 2005

(65) Prior Publication Data

US 2006/0218510 A1    Sep. 28, 2006

(51) Int. Cl.
*G06F 12/00* (2006.01)

(52) U.S. Cl. .................. 707/899; 707/999.01; 715/848; 715/854

(58) Field of Classification Search .................... 707/10, 707/899, 999.01, 999.107; 715/848, 849, 715/852, 854
See application file for complete search history.

(56) References Cited

U.S. PATENT DOCUMENTS

| | | | | |
|---|---|---|---|---|
| 5,533,183 | A * | 7/1996 | Henderson et al. | 715/854 |
| 5,621,874 | A * | 4/1997 | Lucas et al. | 715/205 |
| 5,867,804 | A * | 2/1999 | Pilley et al. | 701/120 |
| 5,920,261 | A * | 7/1999 | Hughes et al. | 340/568.8 |
| 6,031,536 | A * | 2/2000 | Kamiwada et al. | 715/729 |
| 6,182,005 | B1 * | 1/2001 | Pilley et al. | 701/120 |
| 6,314,363 | B1 * | 11/2001 | Pilley et al. | 701/120 |
| 6,414,679 | B1 * | 7/2002 | Miodonski et al. | 345/420 |
| 6,466,239 | B2 * | 10/2002 | Ishikawa | 715/850 |
| 6,731,314 | B1 * | 5/2004 | Cheng et al. | 715/848 |
| 6,850,497 | B1 * | 2/2005 | Sigler et al. | 370/310 |
| 6,971,063 | B1 * | 11/2005 | Rappaport et al. | 715/733 |
| 7,072,863 | B1 * | 7/2006 | Phillips et al. | 705/36 R |
| 7,184,866 | B2 * | 2/2007 | Squires et al. | 701/33 |
| 7,250,944 | B2 * | 7/2007 | Anderson et al. | 345/419 |
| 7,270,268 | B2 * | 9/2007 | Garber et al. | 235/385 |
| 7,295,119 | B2 * | 11/2007 | Rappaport et al. | 340/572.4 |
| 7,295,960 | B2 * | 11/2007 | Rappaport et al. | 703/13 |
| 7,356,777 | B2 * | 4/2008 | Borchardt et al. | 715/836 |
| 7,426,703 | B2 * | 9/2008 | Cheung et al. | 715/854 |
| 7,605,813 | B2 * | 10/2009 | Uthe | 345/440 |

OTHER PUBLICATIONS

Oracle Enterprise Asset Management Data Sheet.
HP OpenView Inventory Manager using Radia Software Data Sheet Hewlett Packard Development Company Copyright 2005.

* cited by examiner

*Primary Examiner*—Andrew Joseph Rudy
(74) *Attorney, Agent, or Firm*—Townsend and Townsend and Crew LLP

(57) ABSTRACT

Methods, systems, and machine-readable mediums are disclosed for managing data centers. In one embodiment, a method is disclosed which comprises receiving, at an interface for a data center management system, a grid location input for a first asset, the grid location input having a grid location value corresponding to a grid location in a data center managed by the data center management system. A first vertical position input for the first asset is also received at the interface, the first vertical position input having a first vertical position value indicating a vertical position. The method further comprises mapping the first asset to the grid location value and mapping the first asset to the first vertical position value.

5 Claims, 9 Drawing Sheets

Layout ADC Q2

| | | CN08-R | | | | CN17-R | | | | | | | CN32-R | | | |
|---|---|---|---|---|---|---|---|---|---|---|---|---|---|---|---|---|
| | | CK05-R | | CK12-R | | CK19-R | | CK26-R | | | | | CK33-R | | | |
| | | CJ05 | CJ09 | CJ12 | CJ16 | CJ19 | CJ23 | CJ26 | | CJ30 | | | CJ33 | CJ37-R01 | | |
| | | CI05 | CI09 | CI12 | CI16 | CI19 | CI23 | CI26 | | CI30 | CI31 | | CI33 | CI37-R02 | | |
| | CH04 | CH05 | CH09 | CH10 | CH12 | CH16 | CH17 | CH19 | CH23 | CH24 | CH26 | CH29 | CH30 | | CH33 | CH37-R03 | CH40-R |
| | | CG05 | CG09 | | CG12 | CG16 | | CG19 | CG23 | CG26 | | | CG30 | CG31 | CG33 | CG37-R04 | |
| 302 | | CF05 | CF09 | | CF12 | CF16 | | CF19 | CF23 | CF26 | | | CF30 | | CF33 | | |
| | | CE05 | CE09 | | CE12 | CE16 | | CE19 | CE23 | CE26 | | | CE30 | CE31 | CE33 | CE37-R05 | |
| | | CD05 | CD09 | | CD12 | CD16 | | CD19 | CD23 | CD26 | | | CD30 | | CD33 | CD37-R06 | |
| 304 | CC04 | CC05 | CC09 | CC10 | CC12 | CC16 | CC17 | CC19 | CC23 | CC24 | CC26 | CC29 | CC30 | CC31 | CC33 | CC37-R07 | |
| | | CB05 | CB09 | | CB12 | CB16 | | CB19 | CB23 | CB26 | | | CB30 | | CB33 | | |
| | CA04 | CA05 | CA09 | | CA12 | CA16 | | CA19 | CA23 | CA26 | | | CA30 | CA31 | CA33 | CA37-R08 | |
| | | BZ05 | BZ09 | | BZ12 | BZ16 | | BZ19 | BZ23 | BZ26 | | | BZ30 | | BZ33 | BZ37-R09 | BZ40-R |
| | | BY05 | BY09 | | BY12 | BY16 | | BY19 | BY23 | BY26 | | | BY30 | BY31 | BY33 | BY37-R10 | |
| | BX04 | BX05 | BX09 | BX10 | BX12 | BX16 | BX17 | BX19 | BX23 | BX24 | BX26 | | BX30 | BX31 | BX33 | BX37-R11 | |
| | | BW05 | BW09 | | BW12 | BW16 | | BW19 | BW23 | BW26 | | | BW30 | | BW33 | | |
| | | BV05 | BV09 | | BV12 | BV16 | | BV19 | BV23 | BV26 | | | BV30 | BV31 | BV33 | BV37-R12 | |
| | | BU05 | BU09 | | BU12 | BU16 | | BU19 | BU23 | BU26 | | | BU30 | | BU33 | BU37-R13 | |
| | | BT05 | BT09 | | BT12 | BT16 | | BT19 | BT23 | BT26 | | | BT30 | BT31 | BT33 | BT37-R14 | |
| | BS04 | BS05 | BS09 | BS10 | BS12 | BS16 | BS17 | BS19 | BS23 | BS24 | BS26 | | BS30 | BS31 | BS32 | BS33 | BS37-R15 |
| | | BR05 | BR09 | | BR12 | BR16 | | BR19 | BR23 | BR26 | | | BR30 | | BR33 | BR34 | |
| | | BQ05 | BQ09 | | BQ12 | BQ16 | | BQ19 | BQ23 | BQ26 | | | BQ30 | | BQ33 | BQ37-R16 | |
| | | BP05-R | | | BP12-R | | | BP19-R | | BP26-R | | | | | BP33-R | | |
| | | BL05-R | | | | BL14-R | | | | | | | BL29-R | | | | |

Grid Location  [EA69  ▼]
              502

Configuration of Grid Location                                           520                                    Total: 2

| | Vendor | Model | Type | Serial# | Hostname | LoB | Quad | Grid | Start RU | F/R | RU Size | Detail |
|---|---|---|---|---|---|---|---|---|---|---|---|---|
| 1 | PROJECT | BLOCKRACK | PROJECT | | | PROJECT | Q5 | EA69 | 1 | F | 45 | Detail |
| 2 | PROJECT | RACK | RACK | | | PROJECT | Q5 | EA69 | 0 | F | 45 | Detail |

Projects Report

[Export]  612

Projects Report    602           604            606           608 Total: 118   610

| | Project# | Data Center | Grid Location | Quad | Oracle PO# |
|---|---|---|---|---|---|
| 1 | | ADC | WAREHOUSE | | |
| 2 | EA65 Move | ADC | ER90 | Q5 | |
| 3 | EB65 Move | ADC | ES90 | Q5 | |
| 4 | EC65 Move | ADC | ET90 | Q5 | |
| 5 | GSIAP AppDev Clone | ADC | EM90 | Q5 | |
| 6 | GSIAP AppDev Clone | ADC | EN90 | Q5 | |
| 7 | GSIAP AppDev Clone | ADC | EO90 | Q5 | |
| 8 | GSIAP AppDev Clone | ADC | EP90 | Q5 | |
| 9 | GSIAP | ADC | CG26 | Q2 | |
| 10 | On-Demand | ADC | EA69 | Q5 | |
| 11 | On-Demand | ADC | EB69 | Q5 | |
| 12 | On-Demand | ADC | EC69 | Q5 | |
| 13 | On-Demand | ADC | ED69 | Q5 | |
| 14 | On-Demand | ADC | EE69 | Q5 | |
| 15 | On-Demand | ADC | EF65 | Q5 | |
| 16 | On-Demand | ADC | EF69 | Q5 | |
| 17 | On-Demand | ADC | EG65 | Q5 | |
| 18 | On-Demand | ADC | EG69 | Q5 | |
| 19 | On-Demand | ADC | EH65 | Q5 | |
| 20 | On-Demand | ADC | EH69 | Q5 | |
| 21 | On-Demand | ADC | EI65 | Q5 | |
| 22 | On-Demand | ADC | EI69 | Q5 | |
| 23 | On-Demand | ADC | EJ65 | Q5 | |
| 24 | On-Demand | ADC | EJ69 | Q5 | |
| 25 | On-Demand | ADC | EK65 | Q5 | |
| 26 | On-Demand | ADC | EK69 | Q5 | |
| 27 | On-Demand | ADC | EL69 | Q5 | |
| 28 | On-Demand | ADC | EM69 | Q5 | |
| 29 | On-Demand | ADC | EN69 | Q5 | |
| 30 | On-Demand | ADC | EO69 | Q5 | |
| 31 | On-Demand | ADC | EP69 | Q5 | |
| 32 | On-Demand | ADC | EQ69 | Q5 | |
| 33 | On-Demand | ADC | ER58 | Q5 | |
| 34 | On-Demand | ADC | ER69 | Q5 | |

Figure 6

Datacenter Rack Space Utilization ADC 700

| ADC | Rack Locations | Rack Locations Occupied | Percent Occupied | Rack Locations Free | Percent Free |
|---|---|---|---|---|---|
| Q2 | 180 | 153 | 85.0% | 27 | 15.0% |
| Q3 | 180 | 107 | 59.4% | 73 | 40.6% |
| Q4 | 180 | 173 | 96.1% | 7 | 3.9% |
| Q5 | 240 | 212 | 88.3% | 28 | 11.7% |
| Q6 | 240 | 240 | 100.0% | 0 | 0.0% |

Figure 7

Utilization ADC Total 800  Total: 23

| | ADC | RU Available | RU Used | Pct Used |
|---|---|---|---|---|
| 1 | ADS | | 1088.0 | 2.4% |
| 2 | APP DEV (CLARK ELMS) | | 86.0 | 0.2% |
| 3 | APP DEV (HUY LY) | | 3522.1 | 7.8% |
| 4 | APPSIT | | 3900.7 | 8.6% |
| 5 | CEL | | 389.2 | 0.9% |
| 6 | CENTER OF EXCELLENCE | | 49.0 | 0.1% |
| 7 | COLLABSUITE | | 92.0 | 0.2% |
| 8 | ECONSULTING | | 632.4 | 1.4% |
| 9 | EDUCATION | | 850.0 | 1.9% |
| 10 | FINANCE | | 24.0 | 0.1% |
| 11 | GIT | | 683.1 | 1.5% |
| 12 | GIT-NETWORKS | | 99.2 | 0.2% |
| 13 | GLOBAL MAIL | | 206.0 | 0.5% |
| 14 | OSS | | 15.0 | 0.0% |
| 15 | OUTSOURCING | | 7798.0 | 17.2% |
| 16 | PROFESSIONAL SERVICES | | 62.0 | 0.1% |
| 17 | PROJECT | | 3459.0 | 7.6% |
| 18 | PTD | | 490.0 | 1.1% |
| 19 | ST DEVELOPMENT | | 9822.8 | 21.6% |
| 20 | TDS | | 485.0 | 1.1% |
| 21 | UNKNOWN | | 54.0 | 0.1% |
| 22 | WEB SERVICES | | 551.0 | 1.2% |
| 23 | Total | 45371.0 | 34856.5 | 76.8% |

Figure 8

DATA CENTER MANAGEMENT SYSTEMS AND METHODS

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent files or records, but otherwise reserves all copyright rights whatsoever.

BACKGROUND

Data center managers are responsible for managing the assets and layout of data centers. Computer Aided Design (CAD) drawings are often one of the primary tools a data center manager may have available to manage the layout of the data center. A CAD drawing may be used to provide a two-dimensional plan view of assets in the data center. More detailed information about the assets may then be tracked in a separate tool, such as a spreadsheet. Information may also be stored in other locations, such as text files, databases, or even in the data center manager's head.

Because of the limited capabilities of the tools available, the management of data centers requires a great deal of manual effort by data center managers. The data center manager may need to use a combination of tools, personal knowledge and manual visualization of a data center to plan for changes to assets. Thus, even with small data centers, the management of a data center is a challenging process. The difficulties increase dramatically with larger and/or more complex data centers that may frequently add, move, or remove assets from a data center.

SUMMARY

Systems, methods, and machine-readable mediums are disclosed to manage data centers. In one embodiment, a method is disclosed which comprises receiving a grid location input for an asset. The grid location input is received at an interface for a data center management system and has a grid location value corresponding to a grid location in a data center managed by the data center management system. A first vertical position input for the asset is also received at the interface. The first vertical position input has a first vertical position value indicating a vertical position. The first asset is mapped to the grid location value and the first vertical position value. Thus, the method may help facilitate 3-dimensional management of a data center.

The method may further comprise receiving, at the interface, a second grid input for a second asset. The second grid location input also has the grid location value. Additionally, a second vertical position input is received at the interface. The second vertical position has a second vertical position value indicating a second vertical position. The second asset is mapped to the grid location value and the second vertical position value.

In some aspects, the first vertical position value may indicate a vertical position in the data center below a floor of the data center. Thus, assets below the data center floor may also be managed by the data center management system. In other aspects, the first vertical position may comprise a rack location value. A rack unit size input may also be received for the first asset. Alternatively, or additionally, a horizontal position input may be received at the interface. The horizontal position input may indicate a horizontal position value at the first vertical position. By way of example, the horizontal position value may indicate one of a front position mounting in a rack unit or a rear position mounting in the rack unit. The method may also further comprise mapping a rack asset to the grid location value.

Further embodiments of the method may comprise receiving, at the interface, a plurality of asset input values associated with the first asset. The asset input values may each indicate an attribute value of the first asset. For example, one of the attribute values may indicate the type of asset (e.g., a computer server, a power distribution unit or a HVAC subsystem). Optionally, at least one of the attribute values may be transmitted from the data center management system to an accounting system and/or a maintenance system.

In still other aspects, the method may further comprise receiving a business unit input for the first asset. The business unit input has a business unit value, which is mapped to the first asset. Other exemplary aspects may include calculating a usage percentage indicating a percent of the data center used by a first line of business and displaying a data center utilization report, which includes the line of business and the usage percentage. By way of example, calculating the first usage percentage may comprise retrieving a plurality of records from a data store. The records are associated with the first line of business and each record includes a space utilization value indicating an amount of space used in the data center (e.g., rack unit size values). Ag a data center utilization report. Optionally, the usage percentage may be transmitted from the data center management system to an accounting system.

Locations in the data center may also be reserved for projects. For example, the method may include reserving a second vertical position at the grid location. The second vertical position is reserved for a project. Alternatively, a grid location may be reserved for a project. Some aspects may further include calculating a usage percentage indicating a percent of the data center used by the project and displaying a utilization report, which includes the project and the usage percentage.

Data center management systems are also disclosed. A data center management system may comprise a user interface and logic communicatively coupled with the user interface. The user interface may be configured to receive a grid location input and a vertical position input for an asset. The grid location input has a grid location value corresponding to a grid location in a data center managed by the data center management system. The vertical position input has a vertical position value indicating a vertical position. Logic may be configured to map the first asset to the grid location value and the first vertical position value.

In some embodiments, the data center management system may further comprise a data store to store the mappings. The data store may also include other information. For example, the data store may further includes asset information for assets in the data center. As other examples, the data store may include layout information for the data center and/or an asset library having a plurality of asset types.

Systems which include a data center management system are also disclosed. In one exemplary embodiment, the system comprises a data center management system and an accounting system. The data center management system is configured to store asset information for a plurality of assets in a data center managed by the data center management system. The data center management system is further configured to map each of at least a subset of the assets to locations in the data center, which include vertical positions. The data center management system is communicatively coupled with the accounting system. The accounting system may manage financial information and may receive data center usage information from the data center management system. Alternatively, or additionally, the system may further comprise a maintenance system, communicatively coupled with the data center management system. The maintenance system may receive asset information from the data center management system and may manage asset maintenance.

The methods may also be embodied in at least one machine-readable medium having instructions which execute on the machine. A further understanding of the nature and advantages of the present invention may be realized by reference to the remaining portions of the specification and the drawings.

BRIEF DESCRIPTION OF THE DRAWINGS

Illustrative embodiments in accordance with the invention are illustrated in the drawings in which:

FIG. 3 is an exemplary display of layout information for a data center that may be displayed by a data center management system.

FIG. 5 illustrates an example of a grid location reserved for a project.

FIG. 6 illustrates an example of a project report which may be provided by a data center management system.

FIG. 7 illustrates an exemplary space utilization report which may be provided by a data center management system.

FIG. 8 illustrates a second exemplary space utilization report which may be provided by a data center management system.

DETAILED DESCRIPTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Figure 1:
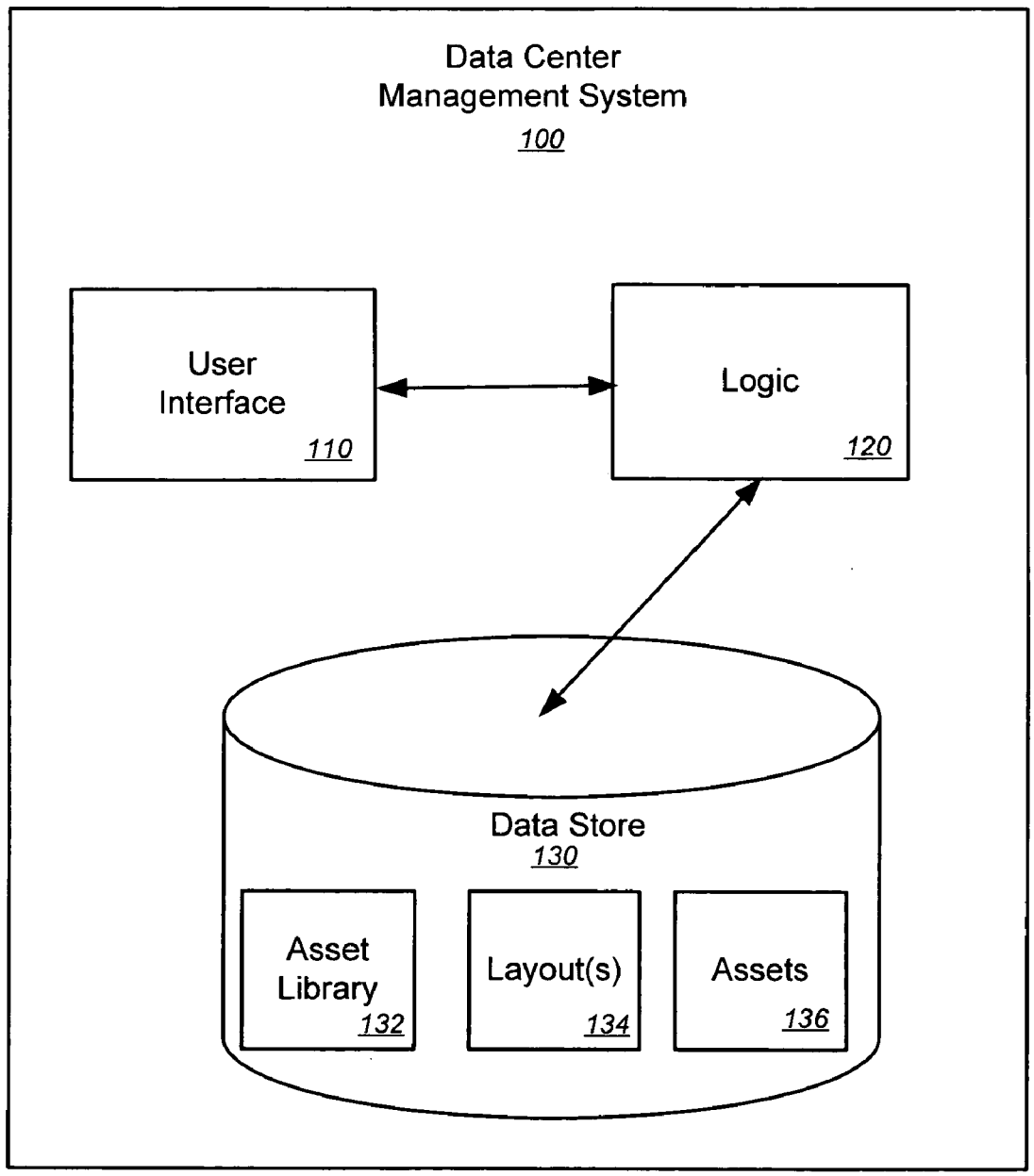
FIG. 1 illustrates a data center management system according to one embodiment.

FIG. 1 illustrates an exemplary embodiment of a data center management system 100. Data center management system 100 may be used to manage one or more data centers. In the illustrative embodiment, data center management system 100 includes user interface 110, logic 120, and data store 130.

User interface 110 may be used to receive inputs and display outputs to a user (e.g., a data center manager) of the data center management system 100. In one embodiment, user interface 110 may be a graphical user interface (GUI). User interface 110 may provide a number of different display interfaces, such as data entry interfaces, data modification interfaces and report interfaces, which may be used to receive inputs and display data to a user. By way of example, a data entry/modification interface may be provided by user interface 110 that allows a user to enter data center locations and/or other information associated with data center assets. Other exemplary interfaces that may be provided by user interface 110 will be described in further detail below.

Data center management system 100 further includes logic 120 communicatively coupled with user interface 110 and data store 130. A communicative coupling may be any type of coupling which allows communication between the components. Thus, logic 120 (or components of logic 120), user interface 110, and data store 130 may reside on the same or different physical devices. In some embodiments, logic 120 may be machine-executable instructions that may be implemented in one or more applications or components of applications.

A variety of different types of data center management functions may be provided by logic 120. For instances, logic 120 may perform operations that may be used to manage assets in one or more data centers and/or manage data center layout(s). Operations performed by logic 120 may include mapping assets to data center locations, managing asset connectivity (e.g., power/network), tracking historical information about an asset, tracking projects using the data center(s), reserving space in the data center(s), or other data center management functionality. Additionally, logic 120 may perform calculations that may be displayed in report(s) provided by user interface 110. For example, logic 120 may calculate data center utilization based on varying criteria (e.g., data center usage by project or line of business). Logic 120 may also provide other types of information that may be displayed by user interface 110.

Data center management information may be in data store 130. Data store 130 may be one or more databases (e.g., a relational database or object database), XML file(s), text file(s), internal software structure(s), or other type of data structure(s). The information in data store 130 may be stored or updated by logic 120 based on information received from user interface 110 or other system(s). Logic 120 may also retrieve information from data store 130 to create reports displayed by user interface 110, to provide information to other requesting systems, or to perform any other type of data center management operation.

Information stored in data store 130 may include asset library information 132, data center layout(s) 134, and asset information 136. Asset library information 132, data center layout(s) 134, and asset information 136 may be stored in a variety of different mechanisms within data store 130. Additional information may also be stored in data store 130.

Asset library information 132 may be used to define asset types. Each asset type included in asset library 132 may have a plurality of attributes associated with the respective asset type. By way of example example, attributes of an asset type may include vendor, model, device type, size (e.g., rack unit size), power consumption, or supplier. In some cases, attributes may vary according to device type. For example, attributes for a server device type may further include hostname, number of CPUs, number of ports, memory capacity, or other standard information that may be associated with the server asset type. Additional, alternative, or fewer attributes may be associated with a particular asset type. Asset library information may be entered by an administrator and/or imported, received from another system, or obtained in any other suitable manner. In some embodiments, asset library information for some or all of the assets included in asset library information 132 may be provided by vendors. This information may be provided by receiving the information from the vendor (e.g., receiving a plug-in or other type of mechanism that may be used to insert asset library information 132).

Data store 130 further includes layout information 134 for one or more data centers. The layout information 134 may include grid locations that can be occupied by assets. A grid location may be a two-dimensional area of the data center. In some embodiments, some of the grid locations may be designated to hold a standard rack (e.g., a 24" rack). Other grid locations may be designated to be occupied by other types of assets (e.g., power, HVAC systems). In some embodiments, layout information 134 may also include locations within the data center(s) designated to be walkways or otherwise unavailable to be occupied.

Asset information 136 includes information for assets in the data center. Each asset included in asset information 136 may have a plurality of associated attributes. By way of example, attributes may include asset type, serial number or other identifying attribute, status, date received, data installed, maintenance data, date removed, line of business, purchase order number, linkages to other assets, connectivity to other assets, port connectivity or other attributes of an asset. Asset information 136 may also include location information which maps the asset to a particular location in a data center (e.g., grid location, vertical location, front/rear mount location, slot location). In some aspects, the location may indicate the asset is in a warehouse or other non-data center location. Other attributes may additionally or alternatively be included as part of asset information 136.

It should be appreciated that in alternative embodiments, data center management system 100 may include additional, different or fewer components than illustrated in FIG. 1. For example, in some embodiments, data store 130 may not include device library 132. As another example, an additional or alternative interface to user interface 130 may be provided to communicate with different systems, such as those illustrated in FIG. 2. Other modifications are also contemplated.

Figure 2:
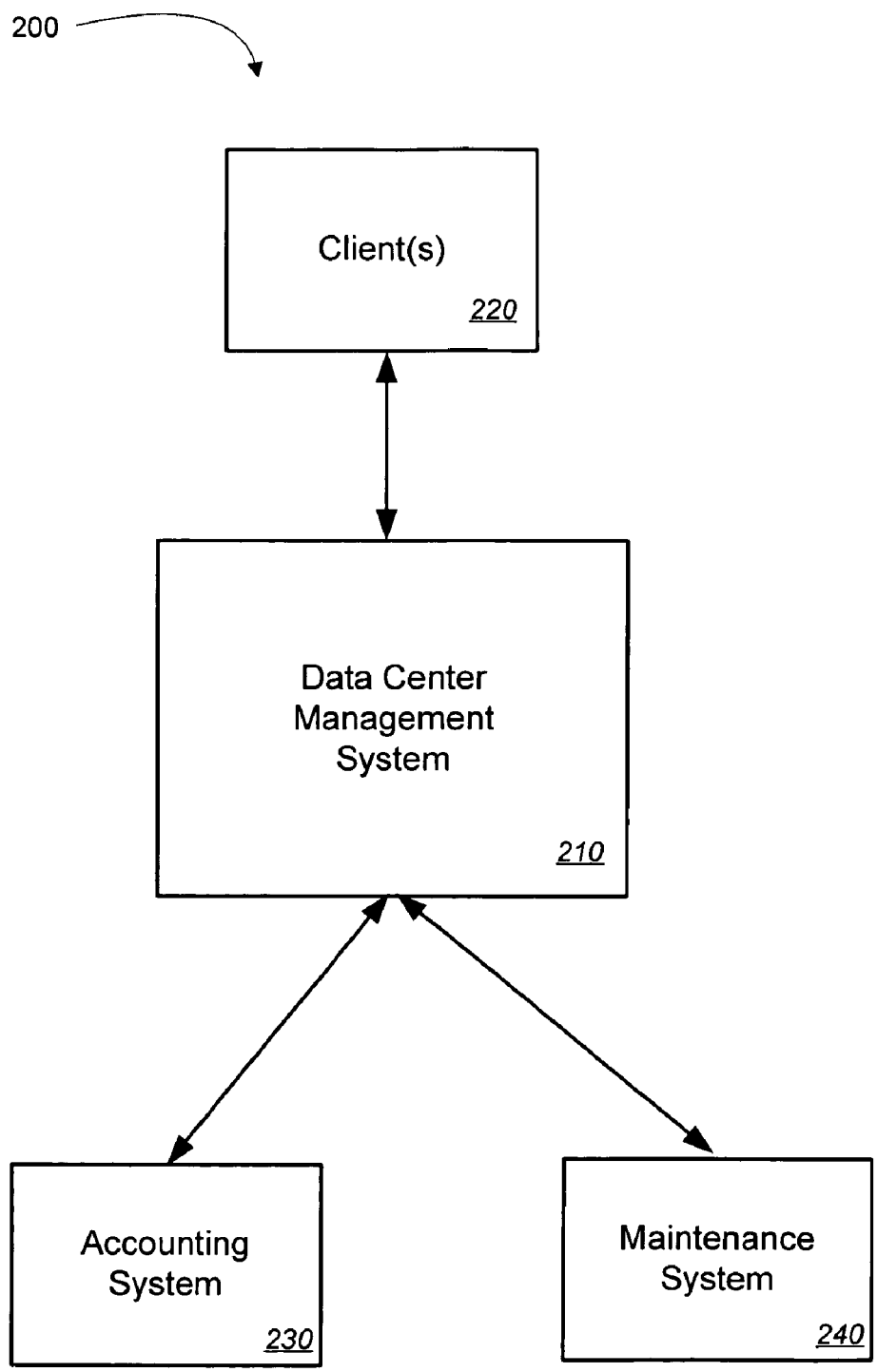
FIG. 2 is a block diagram illustrating an exemplary system which includes a data center management system.

FIG. 2 is a block diagram illustrating an exemplary system that includes a data center management system. The system 200 comprises the data center management system 210 communicatively coupled with one or more client(s) 220, accounting system 230, and maintenance system 240. Client (s) 220 may be computer system(s) or application(s) that requests services from data center management system 210. By way of example, a client 220 may be a web browser application that may be used to provide interfaces to receive data or data modifications from a user and to display data center management information. Other types of client(s) 220 may also communicate with data center management system 210.

Accounting system 230 may also be communicatively coupled with data center management system 210. Accounting system 230 may be one or more applications(s) used to manage financial information, such as general ledger and/or budgeting information, for a business. Data center management system 210 may provide accounting system 230 with data center utilization information that may be used by accounting system 230 to charge lines of business for usage of data center(s). Data center management system 210 may also provide accounting system with asset attributes (e.g., date received, date removed from data center) that may be used by accounting system 230 to calculate financial information. In some instances, accounting system 230 may also provide information to data center management system 210 about assets (e.g., purchase order numbers, asset costs), lines of business, projects, or other information stored by accounting system 230 that may be used by data center management system 210 to facilitate management of data center(s).

A maintenance 240 may also be communicatively coupled with data center management system 210. Maintenance system 240 may be used to schedule and otherwise manage maintenance of assets in data center(s). Data center management system 210 may thus transmit one or more attributes associated with assets that require maintenance to maintenance system 240. The asset information may then be used by maintenance system 240 to schedule maintenance for the assets. Maintenance information, such as scheduled outage dates or date completed, may also be transmitted from maintenance system to data center management system 210. In alternative embodiments, maintenance management may be performed by data center management system 210 and thus, maintenance system 240 may not be included.

It should be appreciated that in alternative embodiments, the system 200 may not include all of the components illustrated in FIG. 2 or may include additional components. For instances, system 200 may not include accounting system 230 or maintenance system 240. As another example, system 200 may include one or more of monitoring system(s) used to monitor asset status, user account management system(s), project management system(s), or other type of systems. Other variations may also be made to system 200.

FIGS. 3-8 illustrate exemplary interfaces that may be provided by a data center management system. The illustrated interfaces may be presented alone, or in combination with other displays or information. In FIG. 3, an exemplary interface 300 that may be used to display data center layout information is shown. A plurality of grid locations 302, 304 in a quadrant in a data center are displayed. In one embodiment, some of the grid locations 302 may be 24"×24" location in the data center that may be used to hold a standard rack. Other grid locations 304 may be special grid locations occupied by facility assets. Special grid locations 304 may in some embodiments be occupied by assets which may not be moved or may be moved with great difficulty (e.g., HVAC systems, patch panels, electrical breakers, large network switches, etc.). In alternative embodiments, grid locations 302, 304 may all be a standard two-dimensional size in the data center, which may be a size different than 24"×24".

Each grid location 302, 304 may, in some aspects, be displayed in a different visual format (e.g., color, font) to indicate information about the grid location. For example, grid locations 302 that are occupied by assets may be displayed in a first color and unoccupied grid locations 302 may be displayed in a second color. Special grid locations 304 may be displayed in a third color. In some aspects, assets, such as non-standardized racks, may span multiple grid locations 302. These grid locations 302 may be displayed in a fourth color to shown that the asset in the grid location spans multiple grid locations.

In alternative embodiments, grid locations may be categorized differently than the example provided and/or different types of visual formats may be used. For example, grid locations designated to be a walkway may be displayed in the layout with a visual indicator indicating the grid is designated to be unoccupied. It should also be appreciated that interface 300 may display layout information for a larger or smaller area than a quadrant in the data center.

Figure 4:
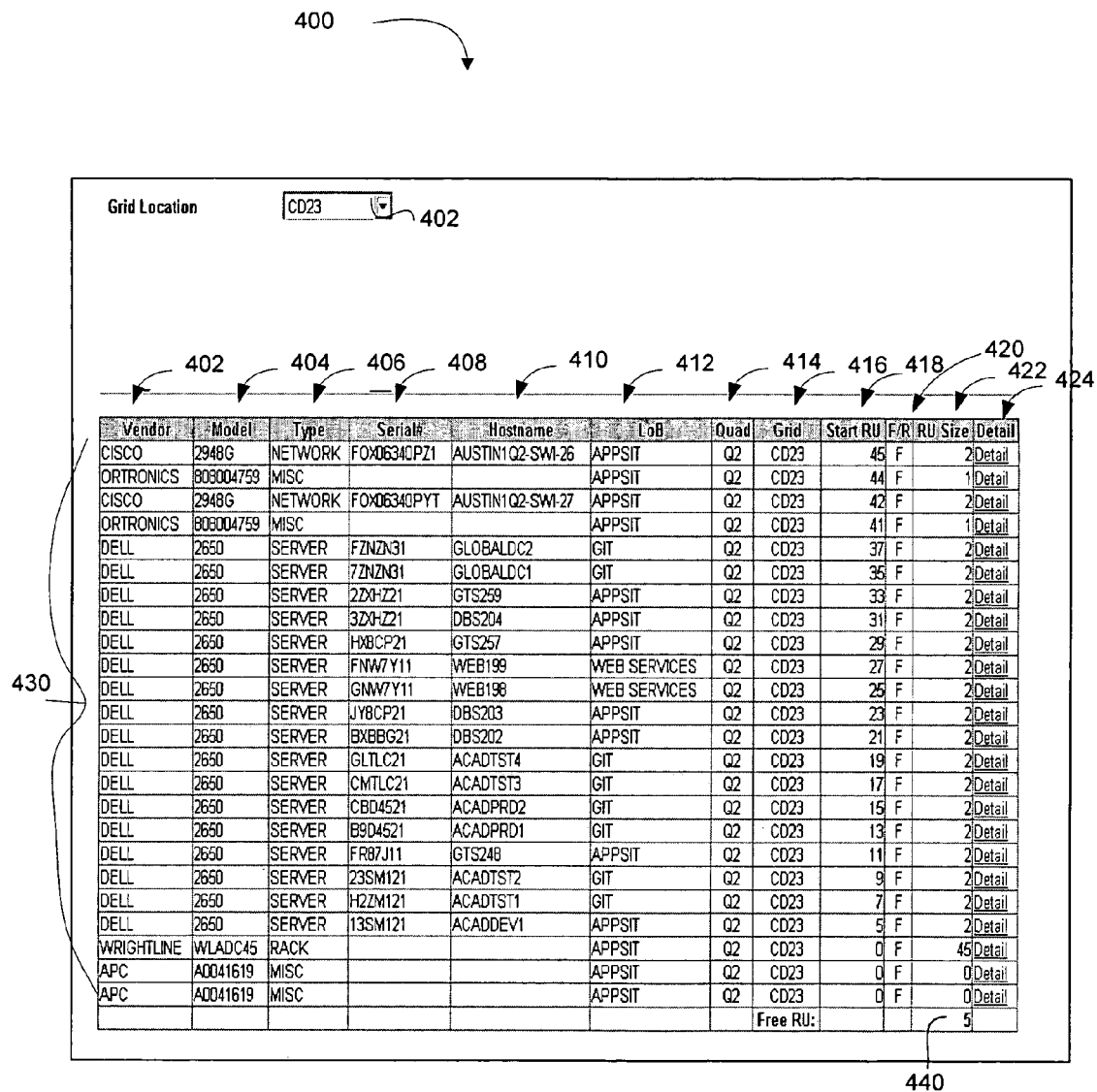
FIG. 4 is an exemplary interface that may be used to display information about a grid location in a data center managed by a data center management system.

FIG. 4 illustrates an exemplary interface 400 that may be used to display more detailed information about a grid location. A first mechanism 402 (e.g., a combination box or text entry box) may be provided for a user to enter a grid location to obtain the more detailed information. Alternatively or additionally, interface 400 may be displayed by clicking on one of the grid locations 302 displayed in an overview layout interface 300.

Interface 400 further includes a plurality of columns 402-424 to display attribute information for assets located at the grid location. A plurality of rows 430 may be used to display each asset located at the grid location designated in 402. The assets may be sorted to visually display the assets respective vertical position (height above/below a floor of the data center) at the grid location. Thus, the asset at the highest vertical position may be displayed in a first row and the asset at the lowest vertical position may be displayed in the last row. Other sorting criteria for displaying assets may also be used.

A first column 402 may display a vendor attribute and a second column 404 may display a model attribute. The device type 406 (e.g., server, network, rack, misc.) may be displayed in a third column. Other exemplary attributes which may be displayed include serial number (displayed in column 406), hostname (displayed in column 410), line of business (displayed in column 412), quadrant (displayed in column 414), and grid location (displayed in column 416).

One of the columns 418 may display an attribute indicating a vertical position of the asset. By way of example, the vertical position may be indicated by a starting rack location value. Other types of values, such as height above/below a data center floor, may alternatively or additionally be used to indicate the vertical position.

In some instances, the asset may only occupy a portion of the grid location at a vertical position. Thus, the position (or portion) of the asset at the vertical position may be displayed in a column 420, such as a column indicating whether the asset is mounted in a front or rear location of a rack. A total amount of vertical space (e.g., rack unit size) occupied by the asset may be displayed in another column 422. A column 424 is also illustrated which may allow a user to get more detailed information about an asset.

Another area 440 of interface 400 may be used to display a total amount of free space available at the grid location. The illustrative rack asset has a total size of 45. As there are no assets located in positions 0-4, the grid location has five total available rack units. Thus, the total rack units free displayed in 440 is five. Other calculations, different than rack units, may also be used to display an amount of unoccupied space at the grid location.

In alternative embodiments, interface 400 may include additional, fewer, or alternative columns 402-424 to display attributes of asset(s) located at a grid location. For example, interface 400 may include column(s) to display a slot number and/or port connectivity number for the asset. Other types of information may also be displayed using interface 400. It should be appreciated that detailed information about assets located at a grid location may be displayed in a different manner than that depicted in FIG. 4.

FIG. 5 illustrates an exemplary grid location reserved for a project. Interface 500 is similar to interface 400 used to show detailed grid location information. A first mechanism 502 may be provided for a user to enter a grid location to obtain the more detailed information. As described with reference to FIG. 4, columns are used to display attributes for assets. Row 510 displays a fictitious asset which may be used as a placeholder to reserve a future rack asset at the grid location. Row 512 displays a placeholder asset used to reserve the entire rack for assets not yet received in the data center. The line of business value 520 for both records indicates that the space is being reserved for a project. Alternatively, the line of business value 520 may indicate the line of business associated with the project and a different attribute may be used to indicate the asset is a placeholder asset to reserve space for a project.

It should be appreciated that a finer granularity, such as vertical position, at a grid location may be reserved for a project. It should also be appreciated that alternative interfaces may be used to display data center space reserved for projects.

FIG. 6 illustrates an example of a project report which may be provided by a data center management system. The projects report 600 includes a plurality of columns 602, 604, 606, 608, 610 to display information about space in the data center which has been reserved for projects. A mechanism 612, such as a button, may be provided which allows the user to export the report data.

Example columns that may be included in a projects report 600 include column 602, which may be used to display project identifiers. Other columns 604, 606, 608 may be used to display information about which space is reserved for the project. For instances, in embodiments in which data center management system is used to manage multiple data centers, a column 604 may display the data center in which space has been reserved. Another column 606 may be used to display the grid location which has been reserved. Column 608 is used to display the quadrant in the data center for which the space has been reserved. Columns may also be provided to display other attribute information about the project, such as purchase order number 610.

An exemplary data center space utilization report 700 which may be provided by a database management system is illustrated in FIG. 7. A number of columns 702-712 are included in the report 700 to display data center utilization information for quadrants of a data center. A number of rows are displayed, each row corresponding to a quadrant in the data center. Column 702 displays quadrant values for which the usage information is being displayed.

Column 704 displays a total number of rack locations available in the quadrant and column 706 displays the number of rack locations occupied. A calculation of the percent occupied (i.e., the value in column 706 divided by the value in column 704) is displayed in column 708.

Information is also displayed on the available space. Column 710 displays the number of rack locations that are free (unoccupied) in a quadrant. A calculation of the total percent unoccupied is displayed in column 712.

The information displayed in report 700 may be used by a data center manager for space planning purposes. In the embodiment of FIG. 7, the report shows occupied and unoccupied space in rack units, which may be sized in accordance with the EIA standard (1.75 inches of vertical space). Alternative embodiments may display space usage in another manner. For example, space usage calculations may be provided for both two-dimensional and three-dimensional usage of the data center. As another example, space usage may be calculated in square and/or cubic feet. Other embodiments may thus display different columns 702-712 than report 700. Additionally, data center usage reports may divide the data center into units other than quadrants and/or may display data center usage calculations for multiple data centers.

FIG. 8 illustrates a second exemplary data center space utilization report 800. Report 800 displays data center usage information by lines of business. Column 802 is used to display a line of business. Columns 806 and 808 display usage information for the respective line of business. For example, usage information may be displayed by total number of rack units used (as illustrated by column 806) and a percentage of the total (percentage used) may be displayed in column 808. Other embodiments may calculate data center usage for lines of business in a different manner.

Column 804 may display a total number of rack units available (or other unit of space). In the embodiment of FIG. 8, available rack units have not been designated for particular lines of business and thus the rack unit attribute is blank for all lines of business and is only displayed in a total row. Alternative embodiments may designate rack units or other data center locations for particular lines of business. Other variations to report 800 may also be made.

Figure 9:
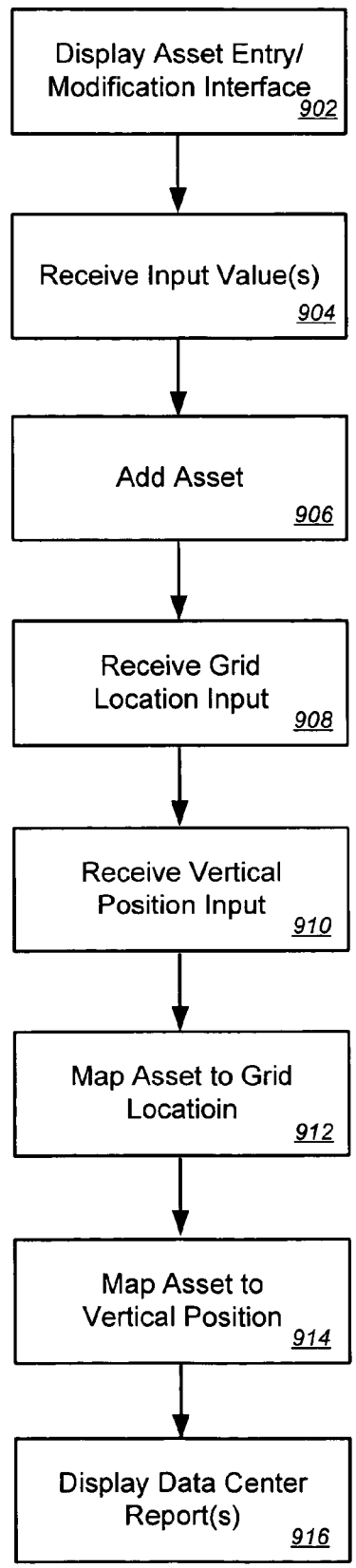
FIG. 9 is a flow diagram illustrating an exemplary method that may be used to manage assets in a data center.

FIG. 9 illustrates an exemplary method that may be used to manage assets in a data center. Upon request by a user, a data center management system may display 902 an asset entry or an asset modification interface. The asset entry/modification interface may allow a user to enter information about a new asset received in the data center or may allow a user to modify existing information about an asset. In some instances, attributes of an asset may be populated with information from an asset library, such as asset library 132. Entry of information may also be constrained to asset types included in the asset library. This may help protect the integrity of the data stored by data center management system.

A plurality of input values 904 are received for an asset. The input values may each correspond to an attribute of an asset. Data center management system may track all types of assets, including computer servers, power, network, HVAC systems, racks, and other equipment included in a data center. Asset attributes may vary depending upon the type of asset being entered or modified by a user. For instance, asset attributes may include serial number, vendor, model number, device type, size (e.g., rack unit size, length/width/height), disk capacity, line of business owning the asset, date received, data installed, date of maintenance, date disposed, power connectivity information, hostname, status, or other type of information about the asset.

The asset may then be entered 906 into the data center management system. The asset may be entered 906 by storing the input values into attribute values associated with the asset (e.g., a record in a relational database). If the input value(s) are modifications to an existing asset, the data center management system may update the asset in accordance with the received 904 input values. In some aspects, batch data that includes asset information and/or data center layout information may be imported into the data center management system from another application.

In some instances, the asset may be initially entered when it is in a warehouse location. Thus, a location value of the asset may be set to warehouse. The user may then at a later time, update the asset to map the asset to a particular location in a data center as described below with reference to blocks 908-914. Alternatively, data location input value(s) may be received 904 as part of the input values.

Asset entry/modification interface or another interface may be used to assign an asset to particular location in a data center. The location values may include data center, quadrant in the data center, grid location, vertical position (e.g., starting rack unit), or other location information. Thus, a grid location input 908 may be received at an interface for the data center management system. The grid location input may have a value corresponding to a grid location in the data center occupied by the asset. A vertical position input may also be received 910. The vertical position input has a value indicating a vertical position occupied by the asset. By way of example, the vertical position input may be a rack location value indicating a position in a rack occupied by the asset. Alternatively, the vertical position may indicate a starting height above or below a floor of the data center. Additional location values, such as a horizontal position value (e.g., whether the asset has a front or rear position mounting in a rack unit, or the slot number occupied by the asset) may also be received. In other embodiments, location values other than grid location/vertical position may be received 908, 910.

The data center management system may then map 912 the asset to the received 908 grid location. The asset is also mapped 914 to the received 910 vertical position. An asset may be mapped 912, 914 to a grid location and/or vertical position by storing the grid location and vertical position values in corresponding attributes associated with the asset. Alternatively, the attribute may be mapped 912, 914 by associating an asset identifier with the data center location corresponding to the received 908, 910 values.

In some instances, an asset may be a project asset used to reserve space in a data center for a project. In other aspects, projects may be a separate type of entity that may be entered into the data center management system. A user may then reserve space for a project by mapping the project to location(s) in the data center.

The user may also use select 916 to display any number of data center report(s). The information displayed 916 may include any of the interfaces/reports described with reference to FIGS. 3-8. Other types of reports that may be useful to a data center manager may also be displayed 916. Merely by way of example, other types of reports that may be displayed 916 may include network and/or power information for capacity planning regarding network or power usage. In some cases, the data center management system may perform calculations which are displayed in the reports. These calculations may be based on asset information and/or layout information stored in a data store.

As one example, data center management system may calculate a usage percentage indicating a percent of the data center used by line(s) of business in order to display a data center utilization report, such as that illustrated in FIG. 8. In order to perform the calculation, asset records for each respective line of business may be retrieved from a data store. The total amount of space occupied by the asset(s) may then be totaled (e.g., the number of rack units used may be totaled) for each line of business and the information may then be displayed 916 in a report. As another example, a similar calculation may be performed to create a utilization report for a percent of the data center used by a project. This information may then be displayed in a project utilization report. Other calculations may also be performed by data center management system to display 916 reports.

Various modification may be made to the method illustrated in FIG. 9. For instances, as previously described, assets may be mapped to different types of data center locations other than grid location and vertical position location. Other variations are also contemplated.

Figure 10:
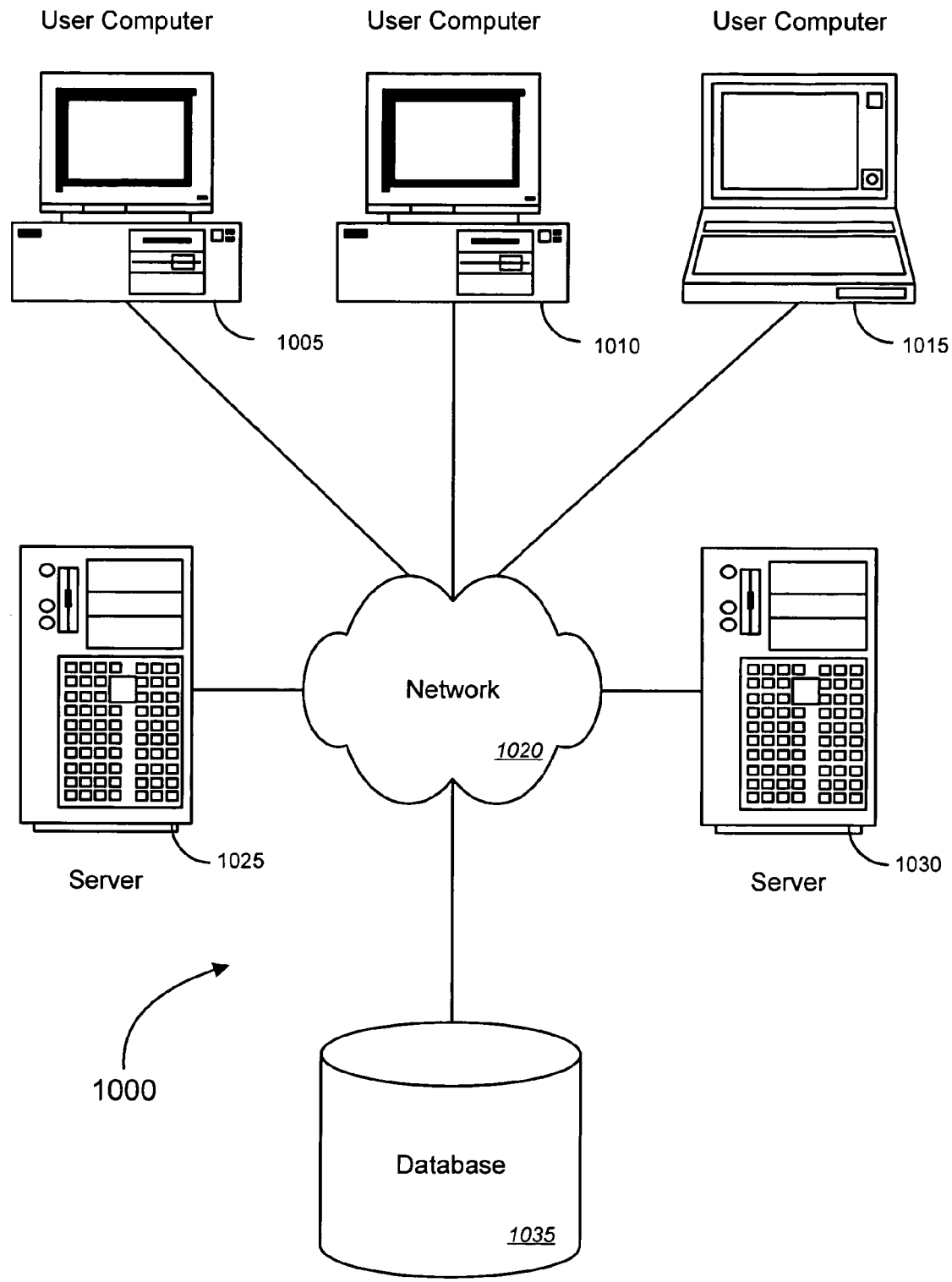
FIG. 10 is an exemplary computer network system.

FIG. 10 illustrates a block diagram of a system 1000 which may include a data center management system. The system 1000 includes one or more user computers 1005, 1010, and 1015. The user computers 1005, 1010, and 1015 may be general purpose personal computers (including, merely by way of example, personal computers and/or laptop computers running various versions of Microsoft Corp.'s Windows™ and/or Apple Corp.'s Macintosh™ operating systems) and/or workstation computers running any of a variety of commercially-available UNIX™ or UNIX-like operating systems. These user computers 1005, 1010, 1015 may also have any of a variety of applications, including for example, database client and/or server applications, and web browser applications. Alternatively, the user computers 1005, 1010, and 1015 may be any other electronic device, such as a thin-client computer, Internet-enabled mobile telephone, and/or personal digital assistant, capable of communicating via a network (e.g., the network 1020 described below) and/or displaying and navigating web pages or other types of electronic documents. Although the exemplary system 1000 is shown with three user computers, any number of user computers may be supported.

System 1000 further includes a network 1020. The network 1020 may be any type of network familiar to those skilled in the art that can support data communications using any of a variety of commercially-available protocols, including without limitation TCP/IP, SNA, IPX, AppleTalk, and the like. Merely by way of example, the network 1020 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth™ protocol known in the art, and/or any other wireless protocol); and/or any combination of these and/or other networks.

The system may also include one or more server computers 1025, 1030. One server may be a web server 1025, which may be used to process requests for web pages or other electronic documents from user computers 1005, 1010, and 1020. The web server can be running an operating system including any of those discussed above, as well as any commercially-available server operating systems. The web server 1025 can also run a variety of server applications, including HTTP servers, FTP servers, CGI servers, database servers, Java servers, and the like.

The system 1000 may also include one ore more file and or/application servers 1030, which can, in addition to an operating system, include one or more applications accessible by a client running on one or more of the user computers 1005, 1010, 1015. The server(s) 1030 may be one or more general purpose computers capable of executing programs or scripts in response to the user computers 1005, 1010 and 1015. As one example, the server may execute a data center management system. In some instances, the data center management system may include a web application component. Thus, the server may also execute one or more web applications. The web application may be implemented as one or more scripts or programs written in any programming language, such as Java™, C, C#™ or C++, and/or any scripting language, such as Perl, Python, or TCL, as well as combinations of any programming/scripting languages. The application server(s) 1030 may also include database servers, including without limitation those commercially available from Oracle, Microsoft, Sybase™, IBM™ and the like, which can process requests from database clients running on a user computer 1005.

In further embodiments, the server 1030 may function as a file server. Although for ease of description, FIG. 1 illustrates a separate web server 1025 and file/application server 1030, those skilled in the art will recognize that the functions described with respect to servers 1025, 1030 may be performed by a single server and/or a plurality of specialized servers, depending on implementation-specific needs and parameters.

The system 1000 may also include a database 1035. The database 1035 may reside in a variety of locations. By way of example, database 1035 may reside on a storage medium local to (and/or resident in) one or more of the computers 1005, 1010, 1015, 1025, 1030. Alternatively, it may be remote from any or all of the computers 1005, 1010, 1015, 1025, 1030, and in communication (e.g., via the network 1020) with one or more of these. In a particular set of embodiments, the database 1035 may reside in a storage-area network ("SAN") familiar to those skilled in the art. Similarly, any necessary files for performing the functions attributed to the computers 1005, 1010, 1015, 1025, 1030 may be stored locally on the respective computer and/or remotely, as appropriate. In one set of embodiments, the database 1035 may be a relational database, such as Oracle 10i™, that is adapted to store, update, and retrieve data in response to SQL-formatted commands.

Figure 11:
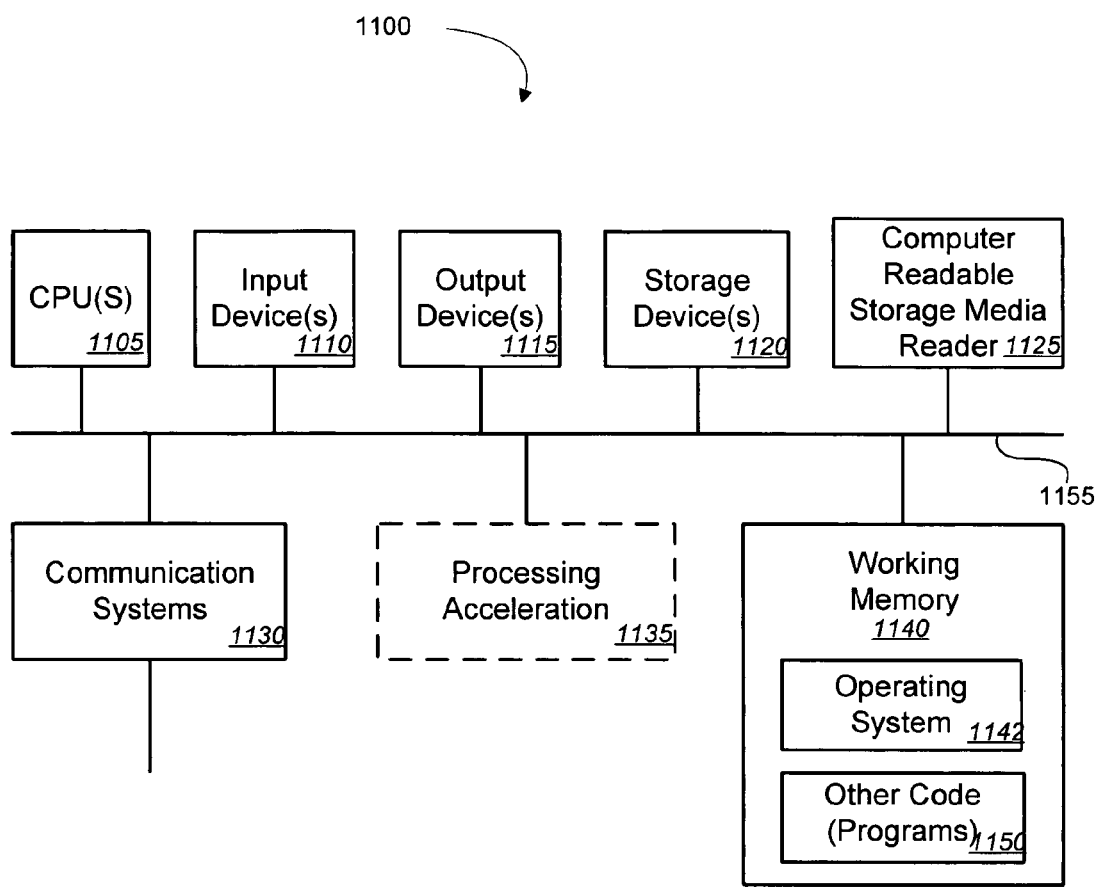
FIG. 11 is a block diagram of a computer system upon which a data center management system, or components of a data center management system, may be implemented.

FIG. 11 illustrates one embodiment of a computer system 1100 upon which a data center management system or components of a data center management system may be deployed or executed. The computer system 1100 is shown comprising hardware elements that may be electrically coupled via a bus 1155. The hardware elements may include one or more central processing units (CPUs) 1105; one or more input devices 1110 (e.g., a mouse, a keyboard, etc.); and one or more output devices 1115 (e.g., a display device, a printer, etc.). The computer system 1100 may also include one or more storage device 1120. By way of example, storage device(s) 1120 may be disk drives, optical storage devices, solid-state storage device such as a random access memory ("RAM") and/or a read-only memory ("ROM"), which can be programmable, flash-updateable and/or the like.

The computer system 1100 may additionally include a computer-readable storage media reader 1125; a communications system 1130 (e.g., a modem, a network card (wireless or wired), an infra-red communication device, etc.); and working memory 1140, which may include RAM and ROM devices as described above. In some embodiments, the computer system 1100 may also include a processing acceleration unit 1135, which can include a DSP, a special-purpose processor and/or the like The computer-readable storage media reader 1125 can further be connected to a computer-readable storage medium, together (and, optionally, in combination with storage device (s) 1120) comprehensively representing remote, local, fixed, and/or removable storage devices plus storage media for temporarily and/or more permanently containing computer-readable information. The communications system 1130 may permit data to be exchanged with the network 1120 and/or any other computer described above with respect to the system 1100.

The computer system 1100 may also comprise software elements, shown as being currently located within a working memory 1140, including an operating system 1145 and/or other code 1150, such as program code implementing a data center management system or components of a data center management system. It should be appreciated that alternative embodiments of a computer system 1100 may have numerous variations from that described above. For example, customized hardware might also be used and/or particular elements might be implemented in hardware, software (including portable software, such as applets), or both. Further, connection to other computing devices such as network input/output devices may be employed.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A data center management system comprising:
   a processor;
   logic executable by the processor to provide a user interface to receive a grid location input for an asset associated with a project, the grid location input having a grid location value corresponding to a grid location at which the asset is located in a data center managed by the data center management system, the user interface further to receive a vertical position input for the asset, the vertical position input having a vertical position value indicating a vertical position at which the asset is located in the data center, wherein the asset is one of a plurality of assets associated with the project;
   logic executable by the processor to map the first asset to the grid location value and to map the first asset to the first vertical position value;
   logic executable by the processor to calculate a usage value indicating a proportion of the data center used by the project; and
   logic executable by the processor to display, in the user interface, a utilization report comprising the usage value.

2. The data center management system of claim 1, further comprising a data store to store the mappings.

3. The data center management system of claim 2, wherein the data store further includes asset information for assets in the data center.

4. The data center management system of claim 2, wherein the data store further includes layout information for the data center.

5. The data center management system of claim 2, wherein the data store further includes an asset library having a plurality of asset types, each asset type including one or more asset type attributes.

* * * * *

UNITED STATES PATENT AND TRADEMARK OFFICE
CERTIFICATE OF CORRECTION

| | | |
|---|---|---|
| PATENT NO. | : 7,805,473 B2 | Page 1 of 1 |
| APPLICATION NO. | : 11/088371 | |
| DATED | : September 28, 2010 | |
| INVENTOR(S) | : Keith S. Ward | |

It is certified that error appears in the above-identified patent and that said Letters Patent is hereby corrected as shown below:

In column 4, line 53, after "of" delete "example".

In column 11, line 33-34, delete "and or/application" and insert -- and/or application --, therefor.

Signed and Sealed this
Seventeenth Day of May, 2011

David J. Kappos
*Director of the United States Patent and Trademark Office*